(12) United States Patent
Torii

(10) Patent No.: US 7,200,850 B2
(45) Date of Patent: Apr. 3, 2007

(54) SPINDLE MOTOR HAVING ALIGNING MECHANISM AND INFORMATION RECORDING/REPRODUCING APPARATUS MOUNTED WITH SUCH SPINDLE MOTOR

(75) Inventor: Shinnosuke Torii, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 376 days.

(21) Appl. No.: 10/949,218

(22) Filed: Sep. 27, 2004

(65) Prior Publication Data

US 2005/0081226 A1    Apr. 14, 2005

(30) Foreign Application Priority Data

Oct. 9, 2003    (JP) .............................. 2003-350344

(51) Int. Cl.
*G11B 17/028*    (2006.01)
(52) U.S. Cl. ..................................... 720/697
(58) Field of Classification Search ............... 720/695, 720/704, 706, 707, 709; 360/99.12, 98.08
See application file for complete search history.

(56) References Cited

U.S. PATENT DOCUMENTS

| | | | |
|---|---|---|---|
| 6,272,104 B1 * | 8/2001 | Liao et al. .................. 720/709 |
| 6,600,628 B2 * | 7/2003 | Kilmer ..................... 360/99.12 |
| 6,760,188 B2 * | 7/2004 | Choo et al. ............... 360/99.12 |
| 6,795,388 B1 * | 9/2004 | Kammerer ................ 369/270.1 |
| 6,826,771 B1 * | 11/2004 | Wada .......................... 720/707 |
| 6,836,461 B2 * | 12/2004 | Baum et al. ............. 369/270.1 |
| 6,993,779 B2 * | 1/2006 | Horng et al. ................ 720/695 |
| 2003/0020341 A1 | 1/2003 | Nagatsuka .................... 310/67 |

FOREIGN PATENT DOCUMENTS

JP        2003-36585        2/2003

* cited by examiner

*Primary Examiner*—Angel Castro
(74) *Attorney, Agent, or Firm*—Fitzpatrick, Cella, Harper & Scinto

(57) ABSTRACT

An easy-to-manufacture spindle motor has an aligning mechanism whose precision is equal to that of cutting of metallic materials without entailing an extra cost. The aligning mechanism is in contact with the center hole of a disk-shaped recording medium and comprises a turntable and an aligning member that has a sliding portion which can be slidably fitted into a guide portion disposed on the turntable. At least one of respective sliding faces of the guide portion disposed on the turntable and the aligning member is configured of a metallic component, and parts other than the metallic component or components of the turntable and/or aligning member are configured of resin materials.

5 Claims, 5 Drawing Sheets

SPINDLE MOTOR HAVING ALIGNING MECHANISM AND INFORMATION RECORDING/REPRODUCING APPARATUS MOUNTED WITH SUCH SPINDLE MOTOR

BACKGROUND OF THE INVENTION

1. Field of the Invention

The present invention relates to a spindle motor having an aligning mechanism for disk-shaped recording media including, for instance, minidisks (MDs), CDs and DVDs, and an information recording/reproducing apparatus mounted with such a spindle motor.

2. Related Background Art

Conventionally, alignment of an optical disk-shaped recording medium with the rotation shaft of an information recording/reproducing apparatus is accomplished with an aligning member provided on a spindle motor for turning the optical disk-shaped recording medium. To illustrate it in more specific terms, a spindle motor mounted on a disk drive for MDs or the like is shown in FIG. 5. Incidentally, this example of conventional aligning structure is substantially the same as an aligning structure of the invention disclosed in the Japanese Patent Application Laid-Open No. 2003-36585.

A spindle motor 30 is configured of a stator unit 31 disposed stationarily and a rotor unit 32 supported to be turnable relative to the stator unit 31.

The stator unit 31 comprises a stator board 33, a housing 34 fitted to the stator board 33, wound coils 35 stationarily disposed to surround the housing 34 from outside, and a plain bearing 36 held within the housing 34 by pressure fitting or otherwise. On the other hand, the rotor unit 32 comprises a rotation shaft 8 turnably held by the plain bearing 36, a turntable 5 fitted to this rotation shaft 8, a cylindrical rotor yoke 9 with an open lower end fitted to this turntable 5 and surrounding the wound coils 35 from outside, a rotor magnet 10 provided within this rotor yoke 9, an attracting magnet 41 disposed on the upper face of the turntable 5, an aligning member 3 slidably fitted into a turntable cylinder portion 6, a restrictive member 43 for restricting the upward movement of the aligning member 3, and a force-applying member 44 for applying an upward force to the aligning member 3 relative to the turntable 5.

Further a disk 1 having an attractable plate 46 over the center hole is mounted on the turntable 5 and, by attracting the attractable plate 46 with the magnetic attraction of the attracting magnet 41 of the rotor unit 32, the disk 1 is mounted on the turntable 5. In this mounting process, the center hole lower end 2 of the disk 1 comes into contact with a tapered face 4, which is the contact portion of the aligning member 3, the aligning member 3 is pressed downward against the force of the force-applying member 44, and the disk 1, aligned to be substantially coaxial with the rotation shaft 8, is mounted on the turntable 5. Incidentally, the force-applying member 44 is disposed to compensate for any tolerance fluctuation of the center hole bore of the disk 1. In other words, the fixation of the aligning member 3 makes impossible compliance with tolerance fluctuations of the center hole bore of the disk 1. When the center hole bore is at its minimum, the disk 1 cannot be mounted on the turntable 5, or when the center hole bore is at its maximum, the backlash from the aligning member 3 increases, making alignment impossible. Additional in this conventional arrangement, the force-applying member 44 uses a compressive coils spring having a round section to prevent the coils from being deformed by compression.

The conventional spindle motor 30 is configured as described above, wherein the rotor unit 32 is rotationally driven by a magnetic field generated on the wound coils 35 by appropriately supplying electricity to the wound coils 35, and the rotor magnet 10 of the rotor unit 32 and the magnetic field derived from the rotor yoke 9 act on each other. In synchronism with the rotation of the rotor unit 32, the disk 1 mounted on the turntable 5 is enabled to turn without slipping by the attractive force of the attracting magnet 41.

When information is to be recorded onto or reproduced out of the disk-shaped recording medium (hereinafter referred to as simply "disk"), it is necessary to accurately align the track position on the disk and the position of the pickup for recording/reproducing information. Especially if the disk becomes eccentric, the track position will vary in the radial direction of the disk in each turn of the disk correspondingly to the extent of eccentricity. For instance where a CD is played back, pit signals of 1.6 μm in pitch are accurately traced to detect the recorded signals. To accurately align this pickup position, alignment in the radial direction of the disk is accomplished according to the prior art by tracking servo, for instance.

However, in recent information recording/reproducing apparatuses, the disk is turned increasingly faster along with the narrowing of the track pitch and the rise of the transfer rate to meet the need of increased density of information. As a result, the alignment of tracking servo is required to be more accurate and faster. However, it is evidently difficult to achieve more accurate and faster control while maintaining the operating range of tracking servo as it is, and the range tends to be narrowed, making it indispensable to reduce eccentricity.

For this reason, the currently used method is, as described above, to configure an aligning member having a tapered face, which fits with the guide portion of a turntable to be mounted with a disk and comes into contact with the center hole of the disk to be slidable in the direction of the rotation axis of the turntable, and thereby to absorb any tolerance fluctuation of the center hole of the disk to achieve highly precise alignment. However, this involves a problem that the play needed for this sliding causes the aligning member to incline and accordingly to vary the angle of the taper face, inviting eccentricity at the time of mounting the disk. This problem is usually addressed by fabricating the turntable and the aligning member together constituting the play for sliding from metallic materials which permit precision machining so as to minimize the play for sliding. However, by reason of the limitation of machining accuracy, it is also necessary to allow for a tolerance fluctuation of 5 to 10 μm to the diameter of the guide portion disposed on the turntable and the sliding portion of the aligning member, which together constitute the play for sliding. Therefore, even if the tolerance fluctuation due to the combination of the guide portion and the sliding portion is minimized to 0 μm (though sliding is virtually impossible with a play of 0 μm between the sliding portions), the play can be as large as 20 μm at the maximum depending on the combination, which would cause the aligning member to substantially incline, resulting in increased eccentricity. For this reason, by the conventional process, even if the aligning member and the turntable are cut from metallic materials permitting precision machining, the constituent parts should go through screening by dimensional inspection to reduce the tolerance fluctuation of combinations, and this pushes up the production cost.

Furthermore, where the aligning member and the turntable are configured solely of metallic materials as in the conventional process, the usual shapes of the aligning member and the turntable do not permit fabrication by machining in only one direction, and the chucking directions of the aligning member and turntable under machining should be altered on the way, which would undeniably invite an increase in the number of machining steps. Moreover, the change in chucking direction makes it difficult to achieve coaxiality and therefore necessitates adjustment. Furthermore, in the small spindle motor for MD use which the prior art refers to, since both the aligning member 3 and the turntable 5 are very small and thin, their parts may be deformed by the heat in the cutting-off or lathing process, not only the machining time becomes a matter of concern but also dimensional measurement is required after completion. The aforementioned possibility of deformation reduces the yield. Obviously, steps of fastening the rotor yoke 9 and pressing the rotation shaft 8 in are necessitated.

Or if injection molding is used to reduce the production cost, it will be difficult to keep the precision of component parts equal to that of cutting of metallic materials, and this would adversely affect the alignment performance. Problems will also arise in the lubrication and durability of sliding portions.

SUMMARY OF THE INVENTION

An object of the present invention is to provide an easy-to-manufacture spindle motor having an aligning mechanism whose precision is equal to that of cutting of metallic materials without entailing an extra cost, and an information recording/reproducing apparatus mounted with such a spindle motor.

A spindle motor according to the invention has the following configuration.

It comprises a stator unit at least comprising a stationarily disposed stator board, a bearing fitted over the stator board, and wound coils arranged around the bearing; and a rotor unit at least comprising a rotation shaft turnably supported by the bearing, a turntable integrally fastened to the rotation shaft and to be mounted with the disk-shaped recording medium, a rotor magnet fastened to the turntable to be opposite the wound coils, and an aligning member which has a contact portion to be in contact with the center hole of the disk-shaped recording medium and can slide against a guide portion of the turntable, wherein at least one of the respective sliding faces of the guide portion of the turntable and the aligning member is configured of a metallic component, and other parts than the metallic component or components of the turntable and/or aligning member are configured of resin materials.

An information recording/reproducing apparatus according to the invention has a configuration containing the spindle motor described above.

DESCRIPTION OF THE PREFERRED EMBODIMENTS

Figure 1:
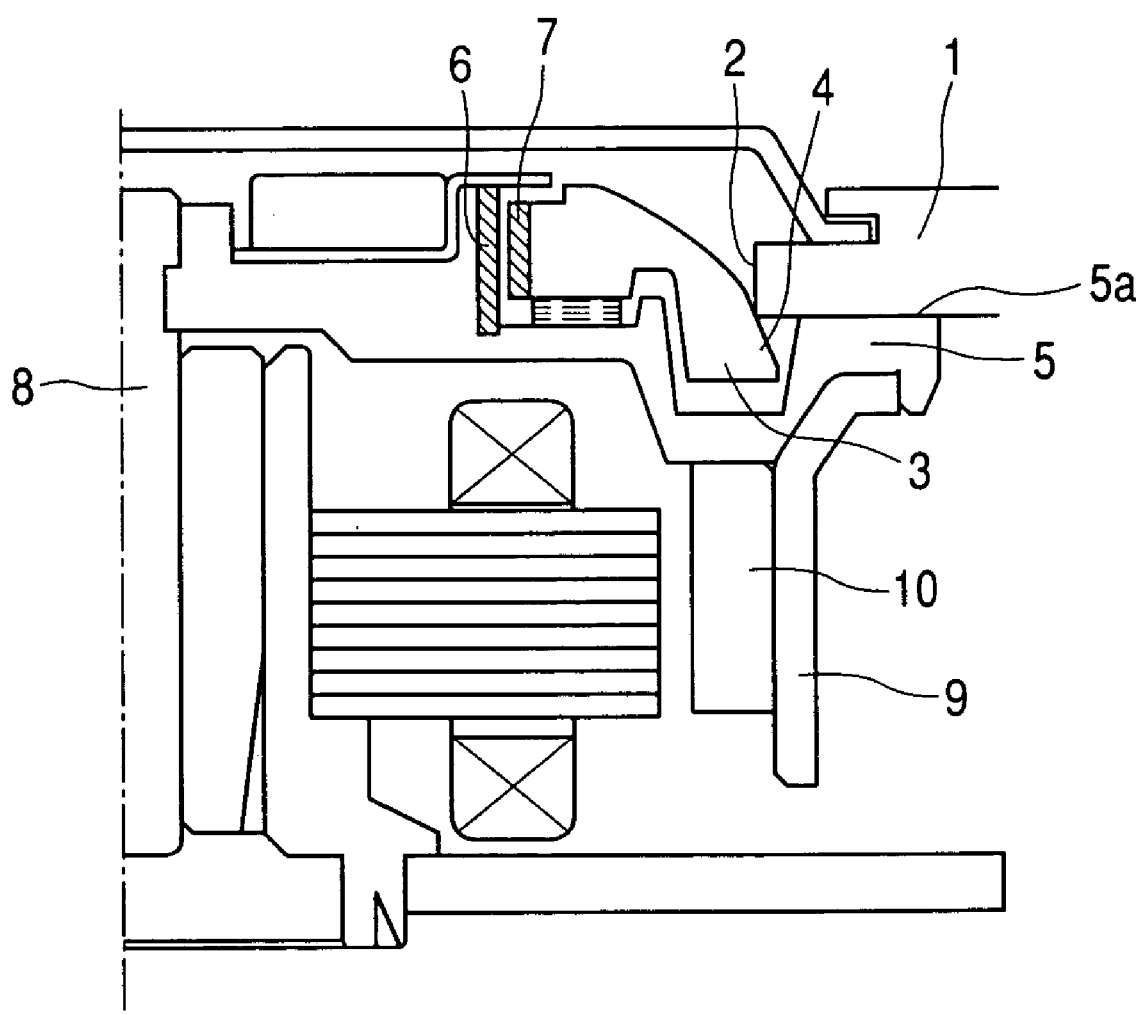
FIG. 1 shows a schematic section of a spindle motor, which is a first preferred embodiment of the present invention.

Preferred embodiments of the present invention will be described in detail below. Only essential parts of the invention are extracted and referred to by signs, of which all are not marked in the drawings. Other specific aspects of the structure are the same as in the structure according to the prior art.

Embodiment 1

FIG. 1 schematically shows a section of the structure of a first preferred embodiment of the invention. In the drawing, reference numeral 1 denotes a disk; 2, the center hole of the disk 1; 3, an aligning member; 4, the contact portion of the aligning member 3 in contact with the center hole 2 of the disk 1; 5, a turntable; 6, a guide portion provided on the turntable 5; 7, the sliding portion of the aligning member 3 fitted into the guide portion 6; 8, a rotation shaft integrally fastened to the turntable 5; 9, a rotor yoke integrally fastened to the turntable 5; and 10, a rotor magnet provided on the rotor yoke.

In this embodiment, the sliding faces of both the guide portion 6 and the sliding portion 7 are formed of cylindrical metallic (e.g. stainless steel) parts of thin walls. For this reason, the lubrication and durability of sliding portions can be improved over the conventional aligning member and turntable made of resin materials alone. The tendency of resin materials to be generally greater than metallic materials in the coefficient of expansion and the resultant susceptibility to the influence of temperature changes can also be solved by the invention. Even if only either, not both, of the guide portion 6 and the sliding portion 7 is made of a metallic material, improvement over the conventional configuration can be achieved.

Or by forming the aligning member 3 and the turntable 5 almost wholly of resin materials, the whole device can be reduced in weight as compared with using only metal materials. This would contribute not only to reducing the weight of the device but also to alleviating the load required for turning the spindle motor, which in turn would help realize a saving in power consumption in driving the spindle motor.

Figure 2A:
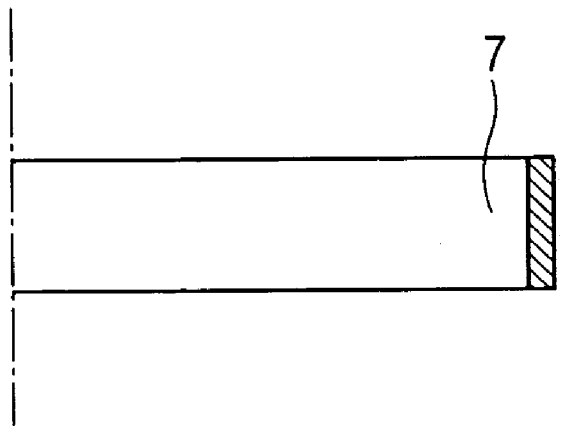
FIGS. 2A and 2B schematically show the fabrication process of the aligning member shown in FIG. 1.
Figure 2B:
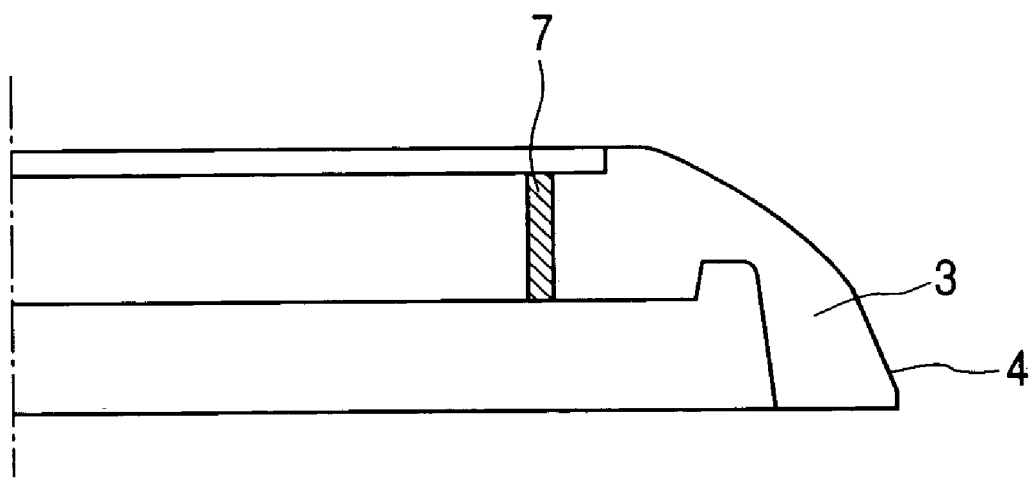

Next, the fabrication process of the aligning member 3 is shown in FIGS. 2A and 2B. Of the two drawings, FIG. 2A illustrates a first step and FIG. 2B, a second step. The two steps will be described in detail below. First, as shown in FIG. 2A, a cylindrical stainless steel pipe which will be fabricated into the sliding portion 7 is arranged in a mold (not shown). After that, the pipe is filled with liquid crystal polymer as a molding resin material to form the aligning member as shown in FIG. 2B.

Figure 3A:
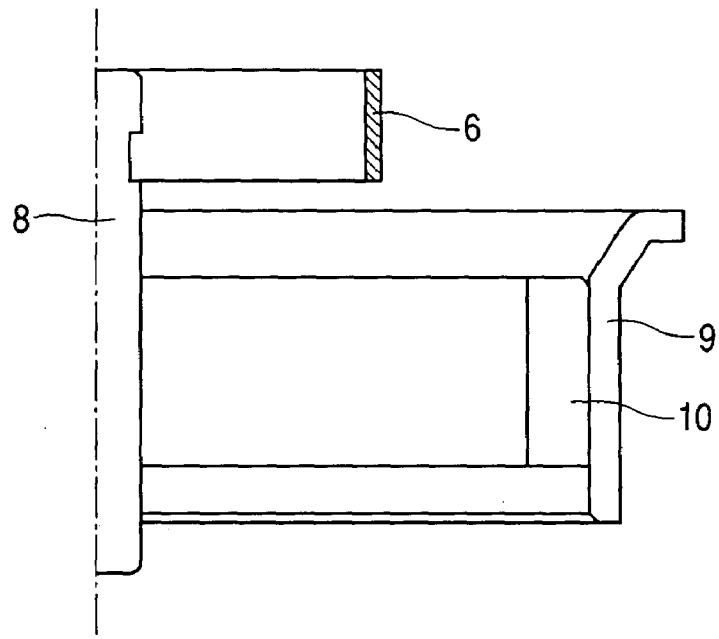
FIGS. 3A and 3B schematically show the fabrication process of the turntable shown in FIG. 1.
Figure 3B:
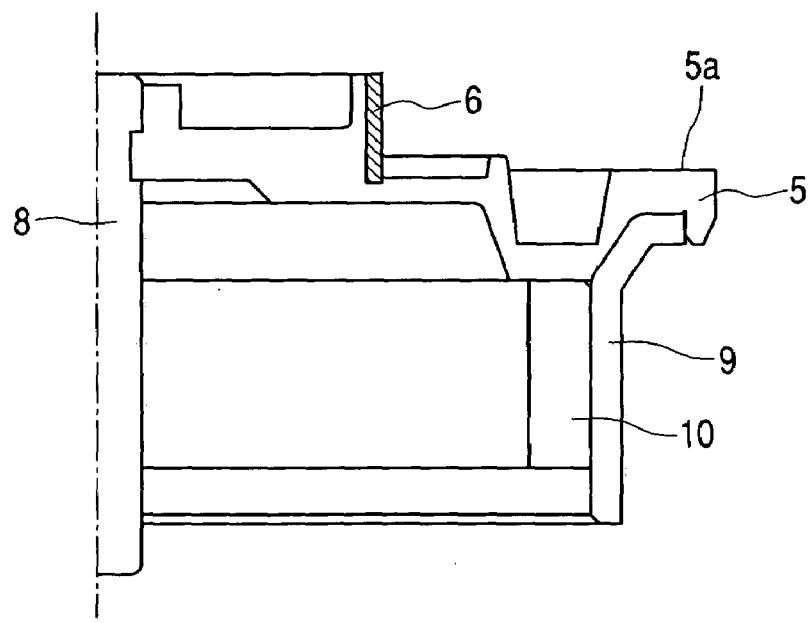

Next, the fabrication process of the turntable 5 is shown in FIGS. 3A and 3B. Of the two drawings, FIG. 3A illustrates a first step and FIG. 3B, a second step. The two steps will be described in detail below. First, as shown in FIG. 3A, a cylindrical stainless steel pipe which will be fabricated into the guide portion 6, the rotation shaft 8, and the rotor yoke 9 provided with the rotor magnet 10 is arranged in a mold (not shown). After that, the pipe is filled with liquid crystal polymer as a molding resin material to form the turntable 5 as shown in FIG. 3B.

As described above with reference to FIGS. 2A, 2B, 3A and 3B, the fabrication method according to the invention uses only a very few steps for producing the components of the spindle motor. Since the guide portion 6 and the sliding portion 7 which demand a high level of precision are composed of metal pipes, it is possible to fabricate them by injection molding after grinding the surface of the pipes and machining them with high precision. In particular, the pipe shape facilitates grinding. Moreover, if the guide portion 6 and the sliding portion 7 were formed by injection molding alone, it would be difficult to control the accuracy of dimensions of the metal molds for forming the guide portion 6 and the sliding portion 7, including their surface accuracy and circularity, and there would also arise a problem of necessity for draft. Furthermore, as stated above, sliding between resin materials leaves problems in durability and lubrication unsolved. By contrast in the structure according to the invention, as it uses metal pipes, it is easy to control the accuracy of dimensions of the guide portion 6 and the sliding portion 7 including their surface precision and circularity, and for other parts the accuracy of dimensions that the conventional injection molding can provide is sufficient. This structure is also effective for controlling with high precision the coaxiality with the rotation shaft 8 and the degree of deviation of the turntable face 5a where the disk 1 and the turntable 5 come into contact with each other from the rotation shaft 8. Thus, the invention enables the accuracy of components, even though formed by injection molding, to be equal to that of cutting of metallic materials, thereby making it possible to achieve comparable alignment performance to what is attained by cutting of metallic materials. It also makes possible overcoming the problems in lubrication and durability of sliding portions which injection molding entails.

Further, as shown in FIGS. 3A and 3B, the rotor yoke 9 provided with the rotor magnet 10 can also be integrally fastened. Since the part of the rotor yoke 9 where the rotor magnet 10 is disposed is also cylindrically shaped, this structure is effective for controlling the accuracy of dimensions, including surface precision and circularity, and coaxiality with the rotation shaft 8 as is the case with the guide portion 6 and the sliding portion 7 mentioned earlier. In particular, since the deviation of the rotor yoke 9 and the rotation shaft 8 from mutual coaxiality would invite fluctuations of the rotation of the rotor unit in each turn of it and thereby seriously affect the signal grade of information obtained from the disk, it has to be kept to the practicable minimum.

Embodiment 2

Figure 4:
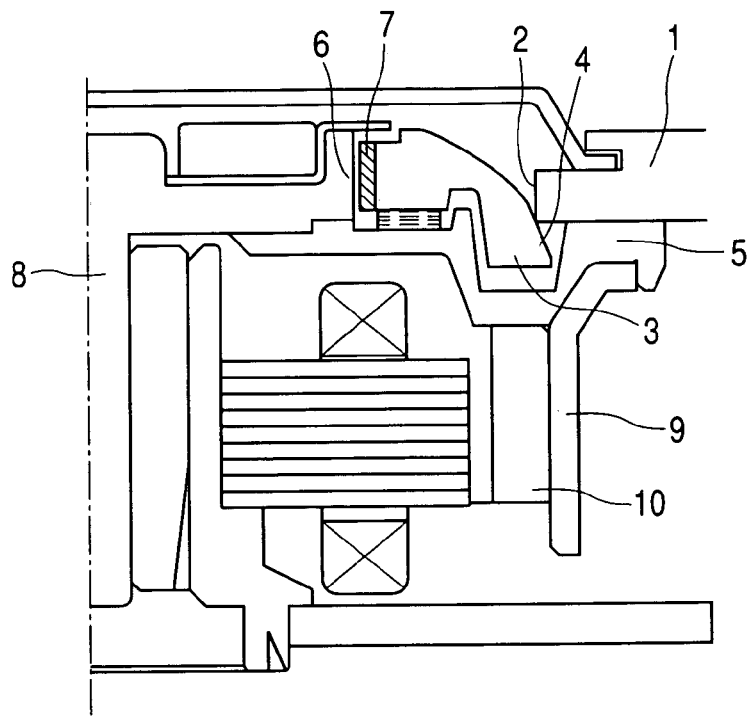
FIG. 4 shows a schematic section of a spindle motor, which is a second preferred embodiment of the invention.
Figure 5:
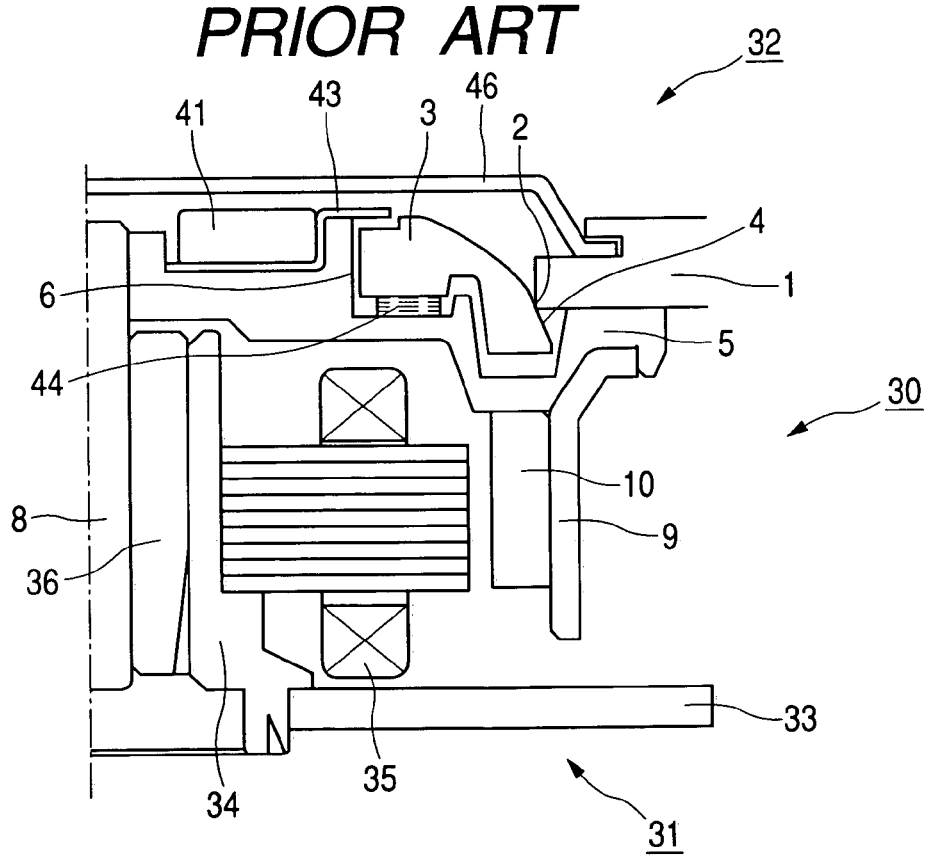
FIG. 5 shows a schematic section of a spindle motor according to the prior art.

FIG. 4 shows a schematic section of the structure of a second preferred embodiment of the invention. This embodiment is similar to Embodiment 1 in basic structure, and therefore the description of the same parts is dispensed with.

This embodiment differs from Embodiment 1 in that the guide portion 6 (in FIG. 4, the face of the sliding portion is shown as the guide portion) and the rotation shaft 8 are integrally formed. This integration facilitates a reduction in the number of parts and formation of the guide portion 6 and the rotation shaft 8 in highly precise coaxiality. Further, as the guide portion 6 is formed on the outer circumferential part of the rotation shaft 8, it contributes to the ease of grinding and other modes of machining as does the pipe shape in Embodiment 1.

Obviously, the invention is not limited to the shape shown in connection with this embodiment, but it is possible not to taper toward the turntable 5 the rotor yoke 9 illustrated in the drawing and instead configure it in a cylindrical metallic pipe shape for instance. Another conceivable way of attracting the disk to the turntable, other than the use of an attracting magnet in this embodiment, is, for example, to use meca-clamping, by which the disk is pressed from above toward the turntable with some other force-applying member.

Embodiment 3

Figure 6:
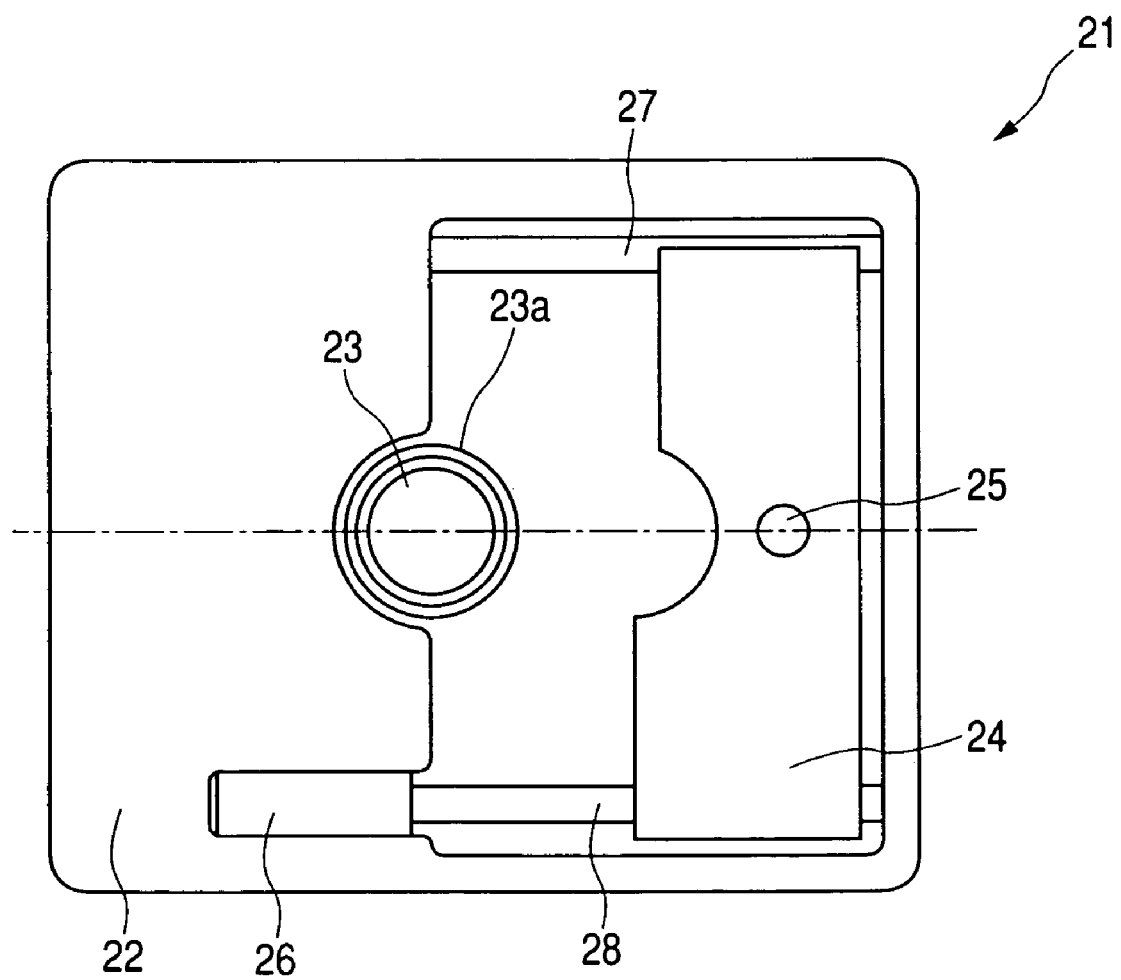
FIG. 6 schematically shows an information recording/reproducing apparatus according to the invention.

FIG. 6 schematically illustrates the structure of an information recording/reproducing apparatus according to the invention. An information recording/reproducing apparatus 21 is configured of a chassis 22 which constitutes the structural base, a spindle motor 23 disposed on the chassis 22 to turn a disk (not shown) that is mounted like its counterpart in Embodiment 1 or Embodiment 2, an optical pickup 24, an objective lens 25 arranged on the optical pickup 24 to radiate a light beam, a feed motor 26 which is arranged on the chassis 22 and has a lead screw 28 to move the optical pickup 24 in the radial direction of the disk, and a guide shaft 27 for supporting the optical pickup 24.

The disk 1 turned by the spindle motor 23 is irradiated with a light beam from the objective lens 25 of the optical pickup 24. The lead screw 28 formed integrally with the rotation shaft of the feed motor 26 and the optical pickup 24 are meshed with each other through racks (not shown). By converting the rotational motion of the lead screw 28 into a parallel motion, the optical pickup 24 moves in the radial direction of the disk 1, guided by the guide shaft 27. In this way, the information recording/reproducing apparatus 21 records or reproduces information onto or out of the disk 1.

This configuration makes it possible to provide an information recording/reproducing apparatus mounted with a spindle motor having an aligning mechanism as precise as one formed by cutting metallic materials without inviting an extra cost. Also, as resin is generally less in mass than metal, the information recording/reproducing apparatus thereby provided can be lighter in weight.

This application claims priority from Japanese Patent Application No. 2003-350344 filed on Oct. 9, 2003, which is hereby incorporated by reference herein.

What is claimed is:

1. A spindle motor for turning a disk-shaped recording medium, comprising:
    a stator unit at least comprising a stationarily disposed stator board, a bearing fitted over the stator board, and wound coils arranged around said bearing; and
    a rotor unit at least comprising a rotation shaft turnably supported by said bearing, a turntable integrally fastened to said rotation shaft and to be mounted with the disk-shaped recording medium, a rotor magnet fastened to said turntable to be opposite said wound coils, and an aligning member which has a contact portion to be in contact with said disk-shaped recording medium and can slide against a guide portion of said turntable,
    wherein at least one of respective sliding faces of the guide portion of said turntable and said aligning member is configured of a metallic component, and parts other than said metallic component or components of said turntable and/or aligning member are configured of resin materials.

2. The spindle motor according to claim 1, wherein said metallic component or components are configured in a cylindrical shape.

3. The spindle motor according to claim 1, wherein said metallic component or components and resin materials are integrally formed by injection molding.

4. The spindle motor according to claim 1, wherein the respective sliding faces of the guide portion of said turntable and the aligning member are configured of metallic components.

5. An information recording/reproducing apparatus for recording and/or reproducing information by irradiating a turning disk-shaped recording medium with a light beam, comprising:
   the spindle motor according to any one of claims 1 to 4, and
   an optical head for irradiating said disk-shaped recording medium turned by said spindle motor.

* * * * *